Patented Feb. 21, 1928.

1,660,246

UNITED STATES PATENT OFFICE.

HENRY V. WILLE, OF PHILADELPHIA, PENNSYLVANIA.

PROCESS OF WELDING CAST IRON.

No Drawing. Original application filed April 14, 1921, Serial No. 461,408. Divided and this application filed July 31, 1922. Serial No. 578,793.

The object of this invention is to produce soft machinable fusion welds on cast iron without the use of preheating or annealing and without the use of iron or steel studs.

The difficulties in producing machinable welds on cast iron are clearly set forth in my copending application, Serial Number 461,408, filed April 14, 1921, and I have therein described a novel process greatly facilitating the production of such soft welds and involving the use of alloys of non-ferrous metals not subject to tempering nor to carbonaceous hardening under the weld conditions. As examples of such alloys I have specified copper-nickel compounds, such as Monel metal, and alloys of nickel and manganese. A deoxidizer such as powdered aluminum is preferably employed with the alloys.

I have discovered that such "immune" metals may also be employed to advantage for the purpose of insulating the main body of the weld material from the iron casting, such insulation not only effectively preventing absorption of carbon from the casting by the main body of the weld material, but also preventing rapid conduction of heat through the casting from the weld with the consequent hardening effects. As a result of such insulation also I am able to employ in the composite filler a much higher percentage of ferrous metals than otherwise would be permissible, this being of advantage on account of the strength, compactness, and relative freedom from blow-holes and defects which the ferrous component confers on the welds.

In practicing my invention, I first apply to the piece a coating layer which completely covers the surface of the piece to which the filler metal of the weld is to be applied, this layer being integrally united or interfused with the metal of the piece. The weld is then filled out and completed preferably with ferrous metal of non-hardening character. For the material of this initial layer, I employ a metal which is not susceptible to any considerable degree of carbonaceous hardening nor to tempering effect under the conditions of fusion welding. The initial layer may accordingly consist of aluminum or of Monel metal or any of the immune metals described in my aforesaid copending application, such as nickel or copper-nickel alloys with or without a deoxidizer such as manganese or aluminum or boron. It may even under some circumstances be of a ferrous alloy but in general the iron should not substantially exceed 50% of the filler, and in some combinations may need to be substantially less. Good results are obtained by using a composite filler rod comprising 20% copper, 40% nickel, and 40% cast iron alloyed together; or one of 52.3% nickel, 2.7% manganese, and 45% iron may be used.

This initial layer may be applied by an autogenous welding or other process, but a considerable advantage is realized by spraying the metal on the piece by one of the well known metal spraying methods. It is possible by this process to spray metallic particles so finely upon the piece being welded that the receiving surface will not be liable to the too sudden chilling which often causes a hardening of the metal and which is caused by rapid conduction of heat from the weld through the iron casting. With the spraying process, the temperature at the weld does not reach the critical point where the too rapid cooling is dangerous. This spray process accordingly eliminates the last possibility of hardening and insures a soft weld. The process further permits the use of "immune" alloys which with fusion welding could not be employed.

Following the application of this initial layer, the main body of the filler may be applied by fusion welding to the initial layer, this portion consisting for example of soft low carbon steel or iron made non-hardening by incorporation of sufficient carbon to insure an adequate amount of graphitic carbon in the weld, such a non-hardening iron being fully described in my aforesaid copending application.

This may be accomplished by several methods. An auxiliary material may be incorporated with the iron to assure the necessary amount of graphitic carbon in the weld. The best auxiliary material for this purpose now known to me is carbon itself when present in substantial excess over the amount required for saturation of cast iron at its fusion point; for when a sufficient excess is present in the fused filler, graphitic precipitation of a considerable amount of carbon on cooling is assured,—no matter how rapid the cooling. Another valuable auxiliary material for the purpose is silicon, whose precipitant influence on carbon in cast iron has already been mentioned. When the amount of silicon in the cast iron is about 3 to 3½%, its influence is a maximum; and nearly all the carbon in the cold iron will then be graphitic unless the cooling has been exceedingly rapid. In percentages varying a little either way from 3 to 3½%, it still tends very strongly to precipitate carbon during cooling. In practice, I have obtained the best results by using considerable percentages of both silicon and carbon to assure graphitic precipitation in the weld.

Welds with such considerable percentages of auxiliary materials in the filler may be made by various methods. One method is to pour into the defect to be repaired (for example) a charge of molten cast iron "superheated" in a small electric furnace to a temperature (say 1600° to 2000° C. or higher) much above its fusion point, and containing an excess of carbon over its 4.6% saturation at ordinary coke or cupola furnace temperatures. Here the high temperature of the molten filler has a twofold function: it enables the iron to absorb up to 8% or more carbon, and it affords an excess heat to bring the weld-strata of the piece up to the melting-point, so as to interfuse and weld with the filler. An electric arc or a torch may preferably be used to keep the filler fluid after pouring until interfusion with the piece takes place, so as to obviate the necessity of pouring the charge at an extreme temperature. If silicon is used in this superheated filler charge, it may preferably be present in excess of 3½% (say a total amount as high as 5%) to off-set loss by oxidation and slagging.

When the weld is to be formed by fusing down a filler-rod, the rod may be cast by pouring into a mold-metal which has been similarly superheated to 1600° C. or over in an electric furnace and surcharged with carbon. By this means it is possible to assure the necessary excess of carbon in the rod in spite of its tendency to burn out as "kish" during cooling. An excess amount of carbon should be secured in the rod; for in active welding with an arc, the strong, oxidizing atmosphere all around will oxidize much of the carbon on the fringe of the arc as the particles pass across to the object being welded, and hence the weld will contain less carbon than the rod. When silicon is used in such a rod, there should be again, an excess of it over the 3½% required to produce the maximum precipitation effect; for during welding part of it will be lost through its deoxidizing action and the resultant slagging. About 5% silicon in the rod will ordinarily suffice. The silicon cuts down the absorption of carbon by the iron at ordinary temperature C. from 4.6% to about 3%. This is of course increased by increased temperatures, and is more than offset by the silicon's precipitant influence during cooling.

In welding with filler in rod form, it is not, of course, necessary that the carbon be combined with the iron or suspended through it, but only that it be present in the cross section of the rod in suitable precentages from point to point of its length. Thus the iron may be in the form of a shell and all or part of the carbon in the form of a core enclosed therein; or iron may form the core and the carbon a shell or coating thereon, or fine iron, carbon and ferro silicon may be mixed with a suitable binder and extruded or pressed into rods. In such cases, carbon (and silicon) in core or shell may advantageously be mixed with a small amount of inert material fusible at about the same temperature as the iron, so as to facilitate the easy and uniform passage of carbon to the weld with the iron. Here the intense heat of the arc superheats the iron and allows it to take up a surcharge of carbon.

Or, again, the iron and the auxiliary material (or part thereof) may be entirely separate rods, separately manipulated. In particular, the arc may be drawn with a carbon rod as electrode, and an iron rod may be used as a filler proper. By proper manipulation with an arc kept much shorter than usual, welds may be rendered soft enough to be machinable by superheating of the iron in the arc and surcharge thereof with carbon from the carbon electrode. Here, again, admixture of an inert fusible material with the carbon may prove advantageous.

As an example of my process, I may spray the surface of a defect in a cast iron piece with aluminum to a thickness of ⅛″, and may thereafter fusion weld to the initial layer a filler consisting of soft, low-carbon steel.

The weld formed in the manner above described is sound, strong and readily machinable and entirely free from any trace of hardness,—the latter especially when the initial layer of immune metal is applied by spraying. The immune layer not only prevents the rest of the filler from absorbing carbon from the weld strata of the piece, but also absorbs so much heat from the rest of the filler that the weld strata of the piece are not raised above their critical temperature. Hence there is accordingly no chance for thin hard lines or spots to form about the edges of the weld as a result of chilling of the weld strata of the piece after they have been heated above the critical temperature and their graphic carbon has become combined. In a word, the immune layer serves as insulation against heat as well as against carbon; and chill hardening effects from carbon in the weld strata of the piece are thereby prevented throughout the weld zone.

It will be understood that the invention is not limited in the materials either for the initial layer or for the filler, nor in the manners in which these elements are applied. The initial layer or stratum of the weld may consist of aluminum, Monel metal, nickel, or any metal or alloy meeting the requirements set forth herein and in my aforesaid copending application, and may even, under some circumstances, be a ferrous alloy. The initial layer further may be applied either by spraying or fusion-welding or in any other suitable manner, although spraying is preferred for the reasons set forth. The thickness of the initial layer may also vary to suit conditions. The material of the filler may also vary from a purely "immune" alloy to one of the aforesaid non-hardening ferrous materials or steel, and may be applied by fusion-welding or in any manner found suitable.

I claim:

1. The method of producing a soft fusion weld on cast iron, which consists in coating the piece over the weld area with a protective coating of metal immune to hardening under weld conditions, and thereafter welding to said coating a ferrous metal containing sufficient carbon to insure free graphitic carbon in the fused metal.

2. The method of producing a soft fusion weld on cast iron, which consists in coating the piece over the weld area with aluminum, and thereafter welding to said aluminum coating a ferrous metal containing carbon in excess of the amount required for saturation at the fusion point of cast iron.

3. The process of producing a soft fusion weld on cast iron, which comprises coating the weld area of the piece with a non-ferrous metal immune to carbonaceous hardening, and thereafter welding to said coating a ferrous metal containing carbon in excess of amount required for saturation at the fusion point of cast iron.

4. The method of producing a soft fusion weld on cast iron, which comprises spraying onto the weld area of the piece a coating of metal immune to hardening under weld conditions, and welding to the said coating an iron filler.

5. The process of producing a soft fusion weld on cast iron, which comprises as an initial step spraying onto the weld area of the piece a coating of metal immune to hardening under weld conditions.

6. The process of producing a soft fusion weld on cast iron, which comprises as an initial step spraying onto the weld area of the piece a coating of metal immune to carbonaceous hardening under weld conditions.

7. The method of producing a soft fusion weld on cast iron, which consists in spraying onto the piece over the weld area a protecting coating of metal immune to hardening under the weld conditions, and thereafter welding to said coating a non-hardening filler.

8. The process of forming soft fusion welds on cast iron, which consists in spraying the surface of the weld area of the piece with aluminum to create an insulating coating, and thereafter welding to the coating a non-hardening metal filler.

9. The process of forming soft fusion welds on cast iron, which consists in coating the weld area of the piece with a thin coating of aluminum, and thereafter welding to the coating a non-hardening metal filler.

10. The process of forming soft fusion welds on cast iron, which consists in coating the weld area of the piece with a thin coating of a non-hardening alloy containing a substantial amount of ferrous metal, and thereafter welding to the coating a ferrous metal containing sufficient carbon to insure graphitic carbon in the fused metal.

11. A soft machinable fusion weld on cast iron comprising a layer of metal immune to hardening under weld conditions next to the piece, and a body of iron containing free carbon separated from the piece by said immune metal.

12. A soft machinable fusion weld on cast iron comprising a layer of metal immune to hardening under weld conditions next to the piece, and a body of ferrous metal supersaturated with carbon separated from the piece by said layer of immune metal.

13. A soft machinable fusion weld on cast iron comprising a layer of aluminum next to the piece, and a body of non-hardening ferrous metal separated from the piece by said aluminum layer.

14. A soft machinable weld or cast iron comprising a layer of metal next to the piece having the characteristic of preventing passage therethrough of carbon from the cast iron, with a body of iron containing carbon in the graphitic form separated from the casting by said layer.

15. A soft machinable fusion weld on cast iron comprising a layer of aluminum next to the piece, and a body of machinable iron separated from the piece by said aluminum.

HENRY V. WILLE.